UNITED STATES PATENT OFFICE.

ARTHUR EICHENGRÜN, OF ELBERFELD, GERMANY, ASSIGNOR TO THE FARBENFABRIKEN OF ELBERFELD CO., OF NEW YORK, N. Y.

DERIVATIVES OF OXYCARBONIC ACID AND PROCESS OF MAKING SAME.

SPECIFICATION forming part of Letters Patent No. 675,544, dated June 4, 1901.

Application filed August 5, 1899. Serial No. 726,260. (Specimens.)

*To all whom it may concern:*

Be it known that I, ARTHUR EICHENGRÜN, doctor of philosophy, chemist, a citizen of Germany, residing at Elberfeld, Germany, (assignor to the FARBENFABRIKEN OF ELBERFELD COMPANY, of New York,) have invented a new and useful Improvement in the Manufacture of Derivatives of Oxycarbonic Acid and Process of Making Same; and I hereby declare the following to be a clear and exact description of my invention.

My invention relates to the production of new derivatives of aromatic oxycarbonic acids which are characterized by the fact that one of the hydrogen atoms of the benzol nucleus is substituted by the group $-CH_2X$, (X meaning a halogen atom, such as chlorin, bromin, or iodin.)

As starting materials for my new compounds I can employ oxycarbonic acids of the benzene or naphthalene series—such as salicylic acid, paraoxybenzoic acid, the cresotinic acids, the oxynaphthoic acids, or the like substances. In order to produce the above-defined new derivatives, the said starting materials are subjected to the action of halogenmethylic alcohols (such as $CH_2Cl.OH$, $CH_2Br.OH$, $CH_2I.OH$) in the presence of a suitable condensing agent, such as hydrochloric acid. The new products thus obtained are crystalline powders characterized by the following reactions: When they are subjected to the action of hot water, the halogen atom of the group $CH_2X$ is replaced by the hydroxy group, and bodies containing the group $CH_2OH$ are produced. When they are subjected to the action of alcohol, bodies containing the group $CH_2.OR$ (R meaning an alkyl radical) are formed. A haloid acid, such as hydrochloric acid or the like, is set free during these two reactions. The new products are valuable remedies, for instance, for the purposes of dermatology.

I illustrate my new process by the following example: 1.38 kilos of salicylic acid are stirred into a solution of 0.665 kilos of chlormethylic alcohol in five liters of highly-concentrated hydrochloric acid. The mixture is heated up to 20° to 40° centigrade and then allowed to stand for twelve hours. After this time a white pasty mass results, which is separated from the liquid by filtering and washing with concentrated hydrochloric acid. The product is then dried at low temperatures and purified by crystallization from benzene. Thus it is obtained in the shape of brilliant leaves, which melt at 160° centigrade and are easily soluble in ether, acetone, acetic acid, acetic ether, benzene, and chloroform, soluble with difficulty in ligroin, insoluble in petrol-ether and cold water.

The new product has most probably the formula:

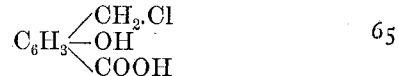

It exhibits the characteristic properties hereinbefore defined. Thus, for instance, by the action of methylic alcohol it is transformed under evolution of hydrochloric acid into a methylic ether melting at 103° centigrade. When heated with water, hydrochloric acid is set free, while the new compound is transformed into the known saligenin carbonic acid, having the formula:

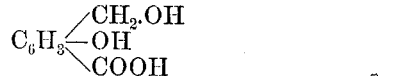

melting at 142° centigrade.

The new compound is a valuable remedy for skin diseases and is intended to be used as a dusting-powder, &c. It is especially valuable in cases of excessive perspiration as a dusting-powder in the form of a ten-per-cent. mixture with talcum.

In order to obtain the new product, it is not necessary to operate with free chlormethylic alcohol. I obtain the same results on using the latter in the so-called "statu nascendi"—viz., by employing instead of chlormethylic alcohol a solution of this body which has been obtained by dissolving formic aldehyde in a concentrated hydrochloric acid and saturating the resulting solution with gaseous hydrochloric acid. The process proceeds in an analogous manner if instead of chlormethylic alcohol bromomethylic or iodomethylic alcohols are used.

Having now described my invention and in what manner the same is to be performed, what I claim as new, and desire to secure by Letters Patent, is—

1. The process for producing new derivatives of aromatic oxycarbonic acids containing the group —$CH_2.X$, X meaning a halogen atom which process consists in first heating a mixture prepared from an aromatic oxycarbonic acid and a solution of a halogenmethylic alcohol in concentrated hydrochloric acid, secondly isolating the products thus obtained by filtration and finally purifying the same, substantially as hereinbefore described.

2. The process for producing a new derivative from salicylic acid, having most probably the formula

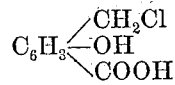

which process consists in first heating a mixture prepared from salicylic acid and a solution of chlormethylic alcohol in concentrated hydrochloric acid at from 20° to 40° centigrade, secondly filtering off the resulting product and finally purifying the same substantially as hereinbefore described.

3. As new articles of manufacture the new derivatives of aromatic oxycarbonic acids which are characterized by the fact that they contain the group —$CH_2X$, X meaning a halogen atom, being crystalline powders, being transformed by the action of water into bodies containing the group —$CH_2$—OH, being changed into compounds containing the group —CH.OR, R meaning an alkyl radical if they are subjected to the action of alcohols and which are insoluble in cold water and soluble in most organic solvents, substantially as hereinbefore described.

4. As a new article of manufacture the new derivative from salicylic acid, having most probably the formula

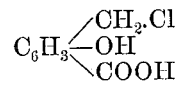

being a crystalline powder melting at 160° centigrade, easily soluble in ether, acetone, acetic acid, acetic ether, benzene and chloroform, soluble with difficulty in ligroïn and insoluble in petrolether and cold water; being transformed by the action of hot water into saligenin carbonic acid, being transformed into a methylic ether melting at 103° centigrade when subjected to the action of methylic alcohol, substantially as hereinbefore described.

In testimony whereof I have signed my name in the presence of two subscribing witnesses.

ARTHUR EICHENGRÜN.

Witnesses:
R. E. JAHN,
OTTO KÖNIG.